United States Patent [19]
Guilloud et al.

[11] Patent Number: 5,568,847
[45] Date of Patent: Oct. 29, 1996

[54] DEVICE FOR PROVIDING A RIGID MECHANICAL LINK WITH FREQUENCY CUT-OFF

[75] Inventors: Jean-Claude Guilloud, Plaisir; Daniel Trouchet, Paris; Michel Lapautre, Ville-d'Avray; Marc Lepretre, Bois-Colombes, all of France

[73] Assignee: Bertin & Cie, Plaisir, France

[21] Appl. No.: 313,309

[22] PCT Filed: Apr. 2, 1993

[86] PCT No.: PCT/FR93/00332

§ 371 Date: Oct. 5, 1994

§ 102(e) Date: Oct. 5, 1994

[87] PCT Pub. No.: WO93/21460

PCT Pub. Date: Oct. 28, 1993

[30] Foreign Application Priority Data

Apr. 10, 1992 [FR] France ................... 92 04405

[51] Int. Cl.$^6$ ........................................ F16F 5/00
[52] U.S. Cl. ...................... 188/313; 188/322.19
[58] Field of Search .................. 188/311, 312, 188/313, 321.11, 322.11, 322.19; 416/134 A, 500; 244/17.27

[56] References Cited

U.S. PATENT DOCUMENTS

| | | | |
|---|---|---|---|
| 3,477,665 | 11/1969 | Legrand | 244/17.27 X |
| 4,872,649 | 10/1989 | Kawamata . | |
| 5,000,299 | 3/1991 | Goto et al. | 188/312 X |
| 5,316,240 | 5/1994 | Girard et al. | 244/17.27 |

FOREIGN PATENT DOCUMENTS

| | | |
|---|---|---|
| 335786 | 10/1989 | European Pat. Off. . |
| 501658 | 9/1992 | European Pat. Off. . |
| 569663 | 4/1924 | France . |
| WO89/05930 | 6/1989 | WIPO . |

*Primary Examiner*—Lee W. Young
*Attorney, Agent, or Firm*—Bell, Seltzer, Park & Gibson

[57] ABSTRACT

A device for providing a rigid mechanical link with frequency cut-off between two structures, the device comprising a rigid tie-rod (14) the ends of which are secured to the two structures (10, 12) and a cylinder and piston assembly (16, 18) in parallel with the tie-rod (14), the two ends of the cylinder (16) being interconnected by a duct (22) which, together with the cylinder (16), is filled with a liquid of very low viscosity, the device providing filtering of a low excitation frequency applied to one of the structures and preventing the transmission of this frequency to other structures.

12 Claims, 2 Drawing Sheets

DEVICE FOR PROVIDING A RIGID MECHANICAL LINK WITH FREQUENCY CUT-OFF

The invention relates to a device for providing a rigid mechanical link between two structures.

Mechanical linking devices which are used in particular for suspending or supporting one structure by another structure, generally comprise a linking member of more or less high stiffness, for example a spring or a block of elastomeric material, associated with a "dashpot" type means for damping movements between the two structures and for filtering vibrations. Such devices are used in the automotive industry, for suspending the body and the engine assembly of an automotive vehicle. They are characterized essentially in that they dissipate energy and transmit forces, the forces transmitted being proportional to the vibratory speeds.

Hydraulic devices for filtering low frequency vibrations are also known, these being used in particular in the automotive industry and comprising two chambers with resiliently deformable walls which are filled with liquid and connected together via a narrow passage, vibrations of a predetermined low frequency being attenuated by resonance of the mass of liquid being driven along the narrow passage. The low value of the frequency attenuated by these devices is related to the relatively low stiffness of the block or blocks of elastomeric material in which the aforementioned chambers are formed. This low stiffness leads to deformation of the walls of the chambers, which results in the forces at the frequency to be attenuated nevertheless being transmitted in part.

By contrast, when it is required to use mechanical connections of high or very high stiffness, as for example in the case where a helicopter fuselage is to be suspended from a main gearbox mounted between a turbine and a rotor, known devices are not suitable and it has been proposed to balance the vibratory forces generated by the rotor and transmitted by the gearbox, by providing inertial opposing forces of equal value and opposite direction which are produced by masses connected by means of levers to the suspension arms of the main gearbox. The levers provide amplification which allows the weight of the on-board masses to be reduced. Despite this, the weight is still significant and there is insufficient filtering of the low frequency excitation generated by the rotor.

A particular object of the invention is to avoid those disadvantages of the prior art.

The invention provides a device which makes it possible to provide a rigid mechanical link between two structures, whilst cancelling, or at least reducing to a very great extent, the transmission of a low frequency of a given value, and without absorbing energy.

The invention also provides a device of this type which is reliable, lightweight and compact.

To this end, the invention proposes a device for providing a rigid mechanical link with frequency cut-off between two structures, the device comprising a member for transmitting static forces between the two structures and a cylinder-piston assembly, the piston of which is secured to one structure and the cylinder of which is secured to the other structure, the device being characterized in that the member for transmitting static forces is a tie-rod of high stiffness, the ends of which are secured to said structures, and in that the device comprises means for generating inertia instantaneously opposing the displacement of the piston in the cylinder in response to an impulsive or quasi-impulsive acceleration, these means comprising a duct of small cross-section relative to that of the piston, the duct interconnecting the two chambers formed in the cylinder on either side of the piston, and a substantially non-viscous liquid which completely fills the cylinder and the duct, so that the transmission to one of the structures of an impulsive or quasi-impulsive acceleration applied to the other structure, which causes displacement of the piston in the cylinder in one direction, is opposed by the inertia of the liquid displaced in the opposite direction in the duct, this inertia as seen at the piston being equal to the mass of the liquid contained in the duct, amplified by the square of the ratio of the working cross-sectional area of the piston over the cross-sectional area of the duct.

The device of the invention therefore allows an impulsive or quasi-impulsive force applied to the cylinder or the piston to be at least partially balanced by an inertial force of substantially equal value and opposite direction, this force being produced by the displacement at high acceleration of the liquid contained in the duct connecting the two chambers of the cylinder. The resultant inertia on the piston is amplified by the ratio of the square of the cross-sectional areas of the piston and of the duct, i.e. by the fourth power of the ratio of the transverse dimensions of the piston and of the duct. When that ratio is of the order of 10, the amplification factor is of the order of $10^4$. An inertial force of high value can therefore be produced using a small mass of liquid.

In order to avoid energy losses due to friction, it is important for the viscosity of the liquid filling the cylinder and the duct of the device of the invention to be as low as possible. The very small losses due to friction which result from the use of a low viscosity liquid distinguishes the device of the invention in a particularly remarkable manner from the "dashpot" type systems known in the prior art, which are essentially dissipators or absorbers of energy.

It is also important for the cylinder and the duct containing the very low viscosity liquid to be substantially dimensionally stable under the effect of pressure variations, as any deformation of the cylinder or of the duct will result in degradation of the inertia amplification mentioned above and in force being transmitted.

According to another feature of the invention, the dimensions of the duct and the ratio of the cross-sectional areas of the piston and the duct are determined as a function both of an excitation frequency and of the stiffness of the tie rod, so as to substantially cancel or at least very much reduce the transmission of that excitation frequency.

In particular, the device of the invention allows blocking of a low excitation frequency generated by or applied to one of the structures, which frequency would otherwise be transmitted to the other structure. For example, in the case of suspending a main gearbox in a helicopter, the device of the invention allows the blocking of a low frequency produced by the rotation of the blades of the rotor under steady conditions, this low frequency lying in the range about 15 Hz to about 30 Hz, depending on the type of helicopter.

Devices of the invention may also be mounted in series, either to produce a comb filter or a low-pass filter.

Advantageously, the static pressure of the liquid filling the cylinder and the aforementioned duct is greater than at least half the total amplitude of the pressure variations of the liquid, so as to avoid cavitation phenomena. A liquid pressure that is always greater than the saturation pressure of the liquid is thereby guaranteed.

In a preferred embodiment of the invention:

the aforementioned tie-rod passes axially through the piston and the cylinder, the piston and cylinder being of annular form and surrounding the tie-rod axially, the tie-rod is a cylindrical tube, the duct is helically wound around the cylinder and comprises, for example, a helical groove formed in the outside surface of the cylinder and opening at its ends to the inside of the cylinder, and a cylindrical envelope secured to the cylinder and applied sealingly over the outside surface thereof.

Such a device can be produced with a total weight of about 7 kg, to form one of the four suspension arms for a main gearbox of a helicopter, and, by the oscillation of a mass of liquid of about 1 kg, allows an inertial force to be developed equivalent to that of a mass of 700 kg, allowing substantial balancing of the vibrations produced by the rotation of the blades of the rotor under steady conditions and transmitted via the main gearbox to the fuselage, the residual accelerations at the fuselage being of the order of 0.01 g to 0.02 g, which corresponds to a ten-fold improvement over the performance of known systems used for the same purpose.

The invention will be better understood, and other of its features, details and advantages will be more clearly apparent on reading the following description, given by way of example, and with reference to the accompanying drawings in which.

Figure 1:
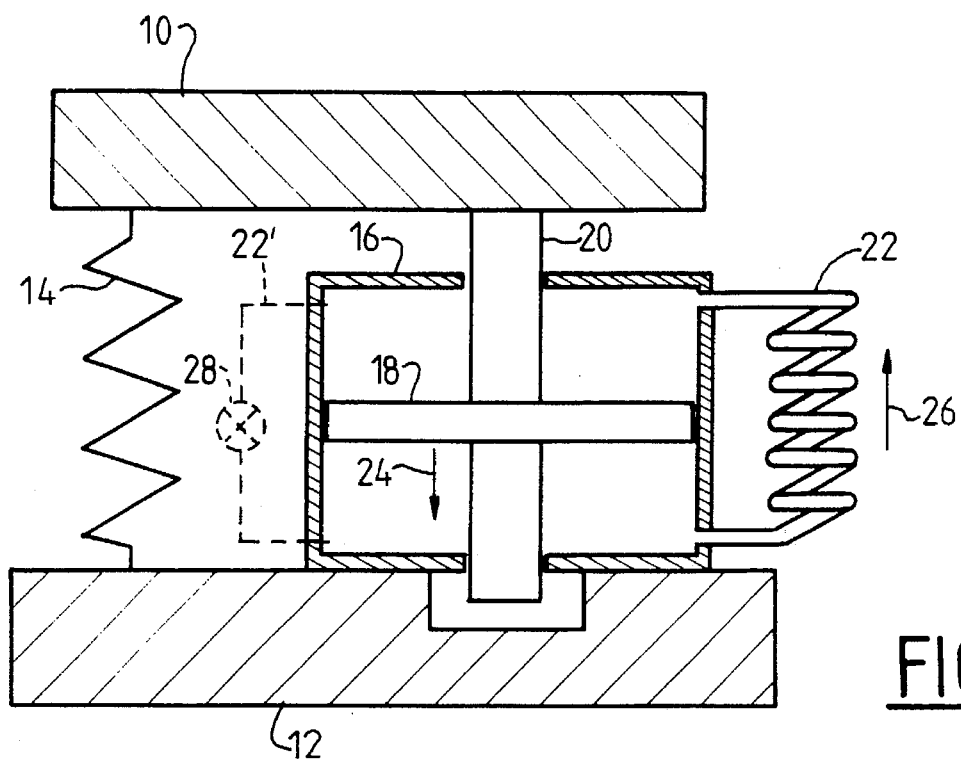
FIG. 1 shows schematically the principle on which the invention is based.

In FIG. 1, reference numerals 10 and 12 respectively designate two structures intended to be rigidly connected to each other by the device of the invention which comprises both a member 14 for transmitting static forces (represented by a spring of very high stiffness with its two ends secured to the structures 10 and 12), and a cylinder-piston assembly 16, 18 disposed in parallel with the member 14, the cylinder 16 being for example secured to the structure 12 whereas the piston 18 is secured to the structure 10 by means of a piston rod 20, the two ends of which pass sealingly through the cylinder 16, the piston 18 itself being displaceable in substantially sealed manner within the cylinder 16. A duct 22 of small internal cross-section compared to the working cross-section of the piston 18, connects together the two chambers formed in the cylinder on either side of the piston 18. The cylinder 16 and the duct 22 are rigid and dimensionally stable and are filled with a liquid of very low viscosity.

When an impulsive or quasi-impulsive acceleration having a vertical component as viewed in the drawing of FIG. 1 is applied to the structure 10, it causes a very limited expansion or compression of the rigid member 14 and a displacement of the piston 18 within the cylinder 16 of corresponding amplitude and direction. The displacement of the piston 18 within the cylinder. 16, for example in the direction indicated by the arrow 24, over an amplitude which may be for example of the ,order of millimeters or less, causes a displacement in the opposite direction, as indicated by the arrow 26, of the very low viscosity liquid which completely fills the cylinder 16 and the duct 22. The mass of the liquid contained in the duct 22 and displaced by the movement of the piston 18 in the cylinder 16, exhibits inertia as seen by the piston 18 which is equal to the mass of the liquid contained in the duct 22 multiplied by the square of the ratio of the working cross-sectional area of the piston 18 to the internal cross-sectional area of the duct 22, i.e. multiplied by the fourth power of the ratio of the corresponding transverse dimensions of the piston 18 and the duct 22, as results from the calculation below:

Let $F_e$ be the force displacing the piston 18 in the cylinder 16 and $\Gamma_e$ the acceleration of the piston 18, S the working cross-sectional area of the piston, P1 and P2 the pressures of the liquid above and below the piston 18, and M the mass of the moving parts. We therefore have:

$F_e = (P1-P2)S + M\Gamma_e$

Whereas in the duct 22:

$P1-P2 = \rho L \Gamma_f$ where $\rho$ is the density of the liquid, L the length of duct 22 and $\Gamma_f$ the acceleration of the liquid in duct 22.

By virtue of flow conservation in the cylinder 16 and the duct 22:

$\Gamma_f = (S/s) \Gamma_e$ where s is the internal cross-sectional area of the duct 22. Thus:

$F_e = \rho L(S/s)\Gamma_e \times S + M\Gamma_e = [\rho Ls(S/s)^2 + M]\Gamma_e$ or: $F = (Mi + M)\Gamma_e$ with $Mi = m(S/s)^2$ where Mi is the inertial mass added to the piston, and $m = \rho Ls$ is the mass of the liquid contained in the tube 22.

It can be seen that the inertia of piston 18 is therefore increased by an amount Mi which is equal to the mass m of liquid contained in the tube 22 multiplied by the square of the ratio S/s, this ratio being equal to the ratio of the working cross-sectional area of the piston 18 over the internal cross-sectional area of the duct 22.

This inertial mass added to the piston may be very significant, even though the actual mass is not great. When the mass of liquid contained in the tube is 1.5 kg and the ratio S/s is equal to 30, the added inertial mass Mi is 1350 kg. In the example shown, the length of the duct 22 is markedly greater than that of the cylinder 16, allowing the mass m of the liquid contained in that duct to be increased without increasing its cross-sectional area s, thereby enhancing the desired effect of inertia amplification.

Considering now a vibratory force applied to the structure 10, a frequency exists for which the device of the invention transmits substantially no dynamic force to the structure 12 (assuming a perfect liquid with no viscosity and therefore no friction).

Let $F_e = A\cos\omega t$ be the vibratory force applied to the structure 10, A its amplitude and $\omega$ its angular frequency, and K the stiffness of the member 14.

The vibratory force transmitted to the structure 12 is then given by $KA - Mi\omega^2 A$.

If the angular frequency $\omega$ is equal to $(K/Mi)^{1/2}$, the vibratory force transmitted to the structure 12 is zero (if the frictional losses in the liquid are ignored, these being very low by virtue of the very low viscosity of the liquid). Under harmonic conditions, the displacement speeds inside the device are in phase quadrature with the applied forces, so the power dissipated in the device is zero (if the small losses due to liquid friction are ignored).

It can therefore be seen that, for a given excitation frequency, the vibratory force transmitted to the structure 12 by the rigid member 14 can be instantaneously balanced, by means of an inertial force of equal value and opposite direction, which results from the acceleration of a very small mass of liquid in the duct 22.

When this frequency is known, it is simple to determine the dimensions of the duct 22 which will allow the above result to be obtained, given the stiffness K of the member 14 and the cross-sectional area ratio S/s.

A plurality of ducts 22 may be provided in parallel with the cylinder 16, as represented for example by 22' in FIG. 1, the ducts 22, 22' having different dimensions, and each duct may be provided with a controllable solenoid valve 28. It is thereby possible with the device of the invention to successively filter a plurality of excitation frequencies, by opening the solenoid valve of each duct (22, 22') in turn and closing the solenoid valves of the other ducts.

Figure 2:
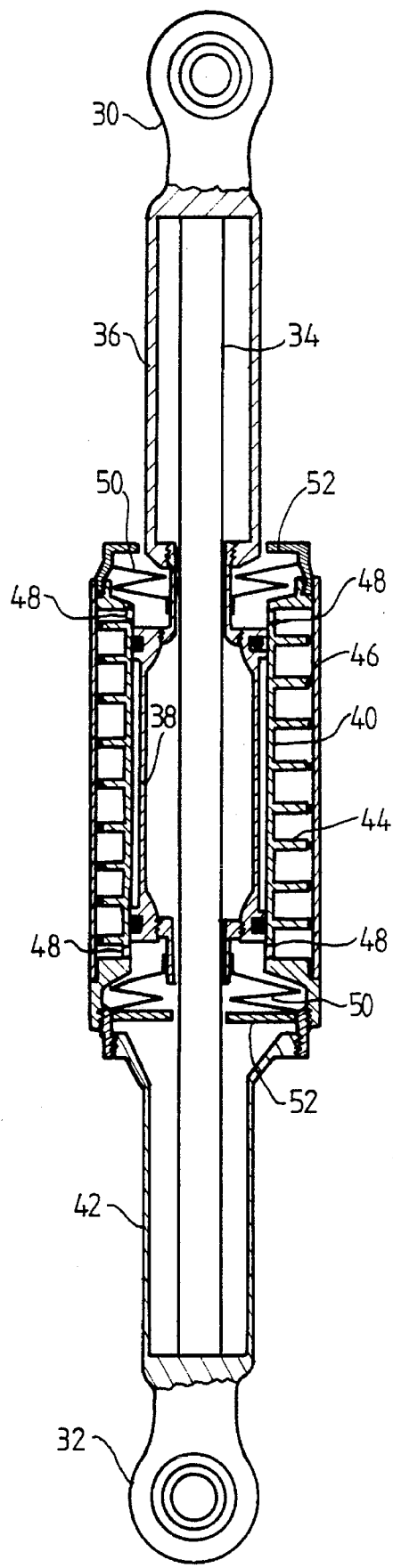
FIG. 2 is a schematic axial section view of a suspension arm of the invention.

A practical embodiment of a device of the invention is represented in FIG. 2.

The device of FIG. 2 constitutes a suspension arm intended to be secured at its ends 30 and 32 to two structures such as the main gearbox of a helicopter and the fuselage of the helicopter, for example. The two attachment ends of this suspension arm are connected rigidly together by an axial tie-rod 34 formed from a hollow steel tube, of length about 80 cm, diameter 30 mm, wall thickness 1 mm and stiffness about $2.5 \times 10^7$ N/m.

A cylindrical sleeve 36 surrounds the upper portion of the tube 34 with clearance, its upper end being secured to the part 30 and its lower end supporting a tubular cylindrical piston 38 which surrounds the central portion of the tube 34 with clearance. This piston 38 is slidably and sealingly mounted within a cylindrical body 40, the lower end of which is connected by a tubular sleeve 42 to the lower securing part 32 of the device. The outside peripheral surface of the cylindrical body 40 includes a helical groove 44 over substantially its entire length, a cylindrical envelope 46 secured to the body 40 being sealingly fitted over the groove. This helical groove communicates with the inside of the cylindrical body 40 by means of orifices 48 which are formed in the axial end of that body, on either side of the tubular piston 38. Moreover, the axial ends of the cylindrical body 40 are each sealingly connected by respective metal bellows 50 to the corresponding axial ends of the tubular piston 38. The space defined by the two metal bellows 50, the inside surface of the cylindrical body 40 and the ends of the piston 38 is filled with a liquid of as low a viscosity as possible (for example, of the order of $10^{-6}$ MKSA) which also fills the helical groove 44.

It will be understood that this liquid-filled helical groove 44 is equivalent to the duct 22 of FIG. 1. The length of the helical groove 44 may be 3.7 m for example, and its liquid flow cross-section 4 cm². The effective cross-sectional area S of the tubular piston 38 may be 95 cm² for example, which gives a ratio S/s equal to 23.75. For a mass of liquid contained in the helical groove 44 equal to 1.5 kg, the added inertial mass is 704 kg. The total weight of this suspension arm is about 7.5

The static pressure of the liquid in this suspension arm is of the order of 15 bars and the two metal bellows 50 withstand this pressure without difficulty.

If it is desired to use liquid at a higher static pressure (which allows the transverse size of the device to be reduced whilst maintaining the same added inertial mass, the reduction in the cross-sectional area S being compensated by the increase in the length L), transverse abutments 52 may be provided at the ends of the cylindrical body 40, against which the two bellows 50 bear, these abutments 52 being secured to the cylindrical body 40 and sliding with respect to the sleeve 36, the piston 38 and/or the tie-rod 34.

The liquid may be pressurized within the cylindrical body or the helical groove, or it may be pressurized via the two bellows 50 when the internal volumes of the sleeve 36, the piston 38 and the sleeve 42 are being filled with a gas under pressure (for example, nitrogen at a pressure of a few tens of bars).

In that case, the suspension arm constitutes a sealed leak-proof member filled with gas and liquid at high pressure.

Figure 3:
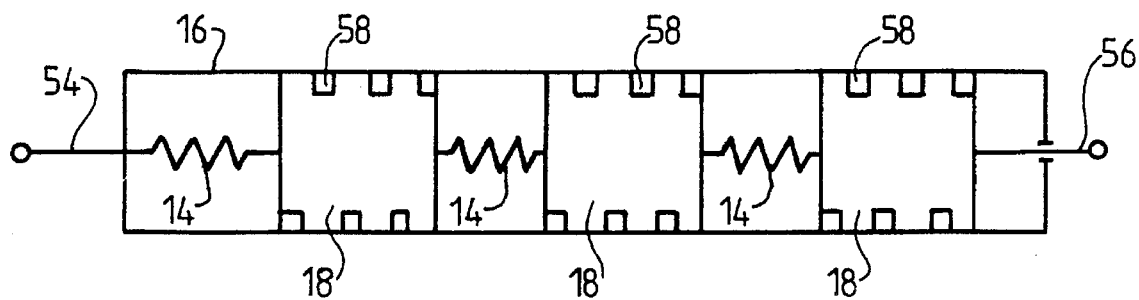
FIG. 3 shows schematically a plurality of devices of the invention mounted in series, to form a low-pass filter.

FIG. 3 shows schematically a plurality of devices of the invention mounted in series, constituting a low-pass filter.

The system comprises, essentially, n cylindrical pistons slidably mounted in series within a cylinder 16, n tie-rods 14 of stiffness K which interconnect the pistons 18, and an end piston 18 at one end of the cylinder 16, which end is provided with a part 54 for securing the cylinder to a structure. A rod 56 for securing to another structure is secured to the other end piston 18 and passes sealingly though the other end of cylinder 16. Each piston 18 includes a narrow duct for the flow of liquid, such as a helical groove 58 formed in its peripheral surface. A pressurized liquid of very low viscosity completely fills the cylinder 16 and the helical grooves 58.

The system acts as a low-pass filter in respect of vibratory forces and has a cut-off frequency equal to $(1/2\pi)[4K/(M+Mi)]^{1/2}$, where K is the stiffness of a tie-rod 14, M is the mass of a piston 18, and Mi is the inertial mass added to a piston 18 as defined by the above formula, such that there is no vibratory force transmitted by the system from one structure to the other at frequencies greater than or equal to the cut-off frequency.

In a variant, a plurality of devices such as that of FIG. 2 may be mounted end to end to form a comb filter, each device being matched to a different low frequency, which may be useful in certain applications.

Moreover, as is immediately apparent to the person skilled in the art, it will be noted that the invention is equally applicable to the attenuation of rotational or torsional vibratory motion.

We claim:

1. A device for providing a rigid mechanical link with frequency cut-off between at least two structures, the device comprising a tie-rod of high stiffness having ends secured to the structures for transmitting static forces between the structures, the device further comprising a cylinder-piston assembly in parallel with the tie-rod, said cylinder-piston assembly comprising a piston secured to one of said structures and a cylinder secured to the other of said structures, and means for generating inertia instantaneously opposing the displacement of the piston in the cylinder in response to a substantially impulsive acceleration, said means comprising a duct having an internal cross-section and a length, the duct interconnecting two chambers formed in the cylinder on either side of the piston, and a liquid which completely fills the chambers and the duct, said liquid having such a low viscosity that frictional losses due to movement thereof are negligible so that the transmission to one structure of any substantially impulsive acceleration applied to the other structure, which causes displacement of the piston in the cylinder in one direction, is opposed by the inertia of the liquid displaced in the opposite direction in the duct, said inertia, when calculated at a location adjacent the piston, being substantially equal to the product of the mass of the liquid contained in the duct and of the square of the ratio of the area of a working surface of the piston over the area of the internal cross-section of the duct, the working surface of the piston being that which displaces the liquid in the cylinder, the area of this working surface being large relatively to that of the internal cross-section of the duct.

2. A device according to claim 1, wherein the length of the duct between the chambers and the said ratio of areas are determined as a function both of the stiffness of the tie-rod and of an excitation frequency, so as to substantially cancel or at least very much reduce the transmission of that excitation frequency.

3. A device according to claim 1, wherein the liquid in the cylinder and in the duct has a static pressure greater than half the maximum amplitude of the pressure variations and use, so as to avoid cavitation phenomena in the liquid.

4. A device according to claim 1, wherein the cylinder and the duct are rigid and substantially dimensionally stable.

5. A device according to claim 1, wherein it includes at least two ducts of different dimensions interconnecting in parallel the two chambers formed on either side of the piston in the cylinder, and controllable means, such as solenoid valves for example, for closing one or other of the ducts.

6. A device according to claim 1, wherein said tie-rod passes axially through said piston and cylinder.

7. A device according to claim 6, wherein the piston and cylinder are annular in shape and surround the tie-rod axially.

8. A device according to claim 1, wherein the tie-rod is a cylindrical tube.

9. A device according to claim 1, wherein said duct is wound helically around the cylinder.

10. A device according to claim 9, wherein said duct comprises a helical groove formed in the outside surface of the cylinder and opening at its ends to the inside of the cylinder, and a cylindrical envelope secured to the cylinder and applied sealingly over the outside surface thereof.

11. A device according to claim 1, wherein it comprises a plurality of pistons slidably mounted in series in the same cylinder, each piston including a duct of small cross-section, the ends of which open out into the cylinder on either side of the piston, a plurality of tie-rods connecting the pistons together and connecting an end piston to an end of the cylinder that comprises means for securing to one of the structures, securing means passing sealingly through the other end of the cylinder for connecting the other end piston to the other structure, and a substantially non-viscous liquid filling the cylinder and the ducts of the pistons, this device constituting a low-pass filter as regards the vibratory forces applied to one of the structures.

12. A device according to claim 1, wherein it comprises a plurality of said devices mounted in series between the structures to constitute a comb filter, each device being tuned to a different low frequency from that of the other devices.

* * * * *